No. 725,524. PATENTED APR. 14, 1903.
W. A. WETMORE.
FISHERMAN'S HAT BAND.
APPLICATION FILED JAN. 7, 1903.

NO MODEL.

WITNESSES:
INVENTOR.
William A. Wetmore
BY
Dewey Strong & Co.
ATTORNEY.

UNITED STATES PATENT OFFICE.

WILLIAM A. WETMORE, OF SAN FRANCISCO, CALIFORNIA.

FISHERMAN'S HAT-BAND.

SPECIFICATION forming part of Letters Patent No. 725,524, dated April 14, 1903.

Application filed January 7, 1903. Serial No. 138,132. (No model.)

*To all whom it may concern:*

Be it known that I, WILLIAM A. WETMORE, a citizen of the United States, residing in the city and county of San Francisco, State of California, have invented an Improvement in Fishermen's Hat-Bands; and I hereby declare the following to be a full, clear, and exact description of the same.

My invention relates to a hat-band especially designed for fishermen's use.

It consists of a flexible band adapted to pass around the hat, said band forming a continuous strip or having a series of independent sections of cork or similar soft material of suitable width and thickness adapted to receive the points of hooks, so that the fishermen may carry a number of hooks and flies conveniently fixed to the hat and avoid the necessity of carrying a fly-hook or other receptacle.

Figure 1:
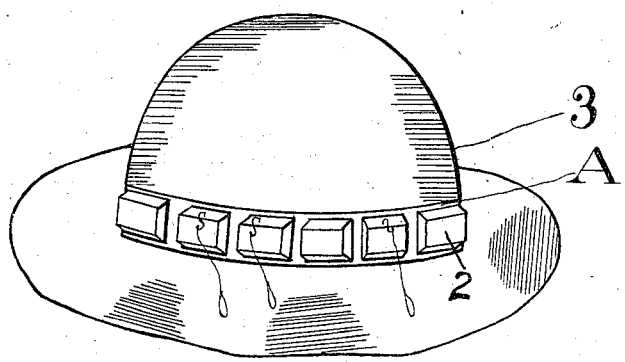
Figure 2:
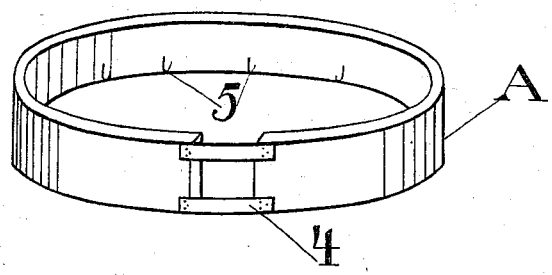
Figure 3:
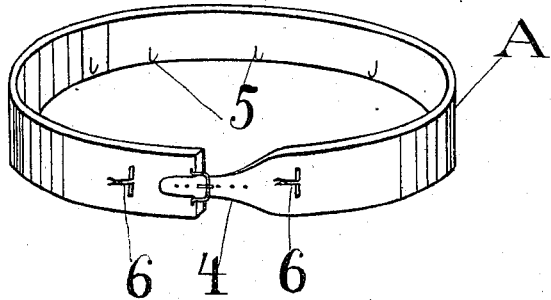

In the accompanying drawings, Figure 1 shows sections upon a band and hat. Fig. 2 shows a continuous band with attaching-hooks. Fig. 3 shows a similar band with buckle attachment and leader-clamps.

The band A is made of any suitable flexible material and is fitted around the bottom of the crown close to the brim 3 in the usual manner of hat-bands.

2 2 are blocks or strips of cork or similar material fixed upon the exterior of the band at short intervals from each other, thus forming a succession of projections which may entirely surround the hat, or, if preferred, the entire band may be formed in a continuous strip of sufficient thickness to receive the points of the hooks, it being understood that the continuous band or the separate blocks or pieces are practically equivalent for the desired purpose. When separate blocks are used, they are secured to the band in any suitable manner, and the band itself is then firmly fixed to the hat-crown, so that it cannot be easily removed, and the projections serve to receive the points of hooks for fishing purposes. Any number of hooks with the usual flies attached may be thus secured separately to the band and in convenient position to be removed for use whenever the fisherman desires to change his flies. The hooks are held with sufficient firmness to prevent their being brushed off or lost in passing through undergrowth, and the fisherman is relieved of the bulk of a fly-book and the danger of losing flies in opening the book to select new ones.

This hat-band is adjustable to any-sized hat by means of buckles, elastic bands, or other equivalent adjusting devices 4, and the band may be either permanently fastened to the hat or it may be transferable to be used on different hats and provided with hooks 5 or other fastenings by which it can be firmly secured to any hat. The band may also have clips or other devices to safely hold leaders, which may be wound around the hat, as at 6.

Having thus described my invention, what I claim, and desire to secure by Letters Patent, is—

1. A device for holding and carrying hooks consisting of a band having an outer surface of compressible elastic material capable of detachably holding the embedded point and barb of the hook, and means for adjustably securing the ends of said band.

2. A device for securing fishermen's hooks and flies, consisting of a continuous flexible band secured around the crown of a hat, a series of independent blocks of cork or like material secured to the band and projecting outwardly therefrom.

3. A device for holding fishing-hooks consisting of a flexible band having sections of cork fixed to it and capable of holding the points of the hooks, and means for adjusting the band to different sizes of hats.

4. A device for holding fishing-hooks consisting of a flexible band having sections of cork fixed to it and capable of detachably holding the points of the hooks, means for adjusting the band to different sizes of hats, means for securing the band to the hat, and attachments to hold the leaders.

In witness whereof I have hereunto set my hand.

WILLIAM A. WETMORE.

Witnesses:
S. H. NOURSE,
JESSIE C. BRODIE.